United States Patent
Boegner et al.

(10) Patent No.: US 6,170,259 B1
(45) Date of Patent: Jan. 9, 2001

(54) EMISSION CONTROL SYSTEM FOR AN INTERNAL-COMBUSTION ENGINE

(75) Inventors: Walter Boegner, Remseck; Karl-Ernest Haak, Lichtenwald; Bernd Krutzsch, Denkendorf; Dirk Voigtlaender, Korntal-Muenchingen; Guenter Wenninger, Stuttgart; Friedrich Wirbeleit, Esslingen, all of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/181,644

(22) Filed: Oct. 29, 1998

(30) Foreign Application Priority Data

Oct. 29, 1997 (DE) ............................. 197 47 670

(51) Int. Cl.$^7$ ................................... F01N 3/00
(52) U.S. Cl. ............................. 60/286; 60/288; 60/295; 60/297; 60/301
(58) Field of Search .................... 60/288, 289, 295, 60/301, 307, 286, 297

(56) References Cited

U.S. PATENT DOCUMENTS

| | | | |
|---|---|---|---|
| 5,085,049 | * 2/1992 | Rim et al. | 60/288 |
| 5,365,734 | * 11/1994 | Takeshima | 60/301 |
| 5,388,406 | * 2/1995 | Takeshima et al. | 60/288 |
| 5,406,790 | * 4/1995 | Hirota et al. | 60/307 |
| 5,586,433 | * 12/1996 | Boegner et al. | 60/295 |
| 5,701,735 | * 12/1997 | Kawaguchi | 60/286 |
| 5,715,677 | * 2/1998 | Wallman et al. | 60/297 |
| 5,910,097 | * 6/1999 | Boegner et al. | 60/286 |
| 5,974,791 | * 11/1999 | Hirota et al. | 60/289 |

FOREIGN PATENT DOCUMENTS

| | | |
|---|---|---|
| 2655-932 | * 6/1978 | (DE) . |
| 43 19 294 C1 | 5/1994 | (DE) . |
| 196 26 837 A1 | 1/1997 | (DE) . |
| 196 28 796 C1 | 10/1997 | (DE) . |
| 6-137131 | * 5/1994 | (JP) . |
| 6-272538 | * 9/1994 | (JP) . |

OTHER PUBLICATIONS

Patent Abstracts of Japan, Pub. No. 03–135417, Pub. Date Jun. 10, 1991.
Patent Abstracts of Japan, Pub. No. 62–097630, Pub. Date May 7, 1981.

* cited by examiner

Primary Examiner—Thomas Denion
Assistant Examiner—Tu M. Nguyen
(74) Attorney, Agent, or Firm—Evenson, McKeown, Edwards & Lenahan, P.L.L.C.

(57) ABSTRACT

An emission control system for an internal-combustion engine has at least one nitrogen oxide adsorber for the periodic adsorption and desorption of nitrogen oxides contained in the exhaust gas of the internal-combustion engine. A desorption gas pipe has an externally heatable catalyst arranged therein to which a mixture of air and/or exhaust gas can be fed as well as fuel at an at least stoichiometric proportion. This mixture is burned to form a desorbing gas flow which is fed to the respective nitrogen oxide adsorber for the nitrogen oxide desorption.

3 Claims, 1 Drawing Sheet

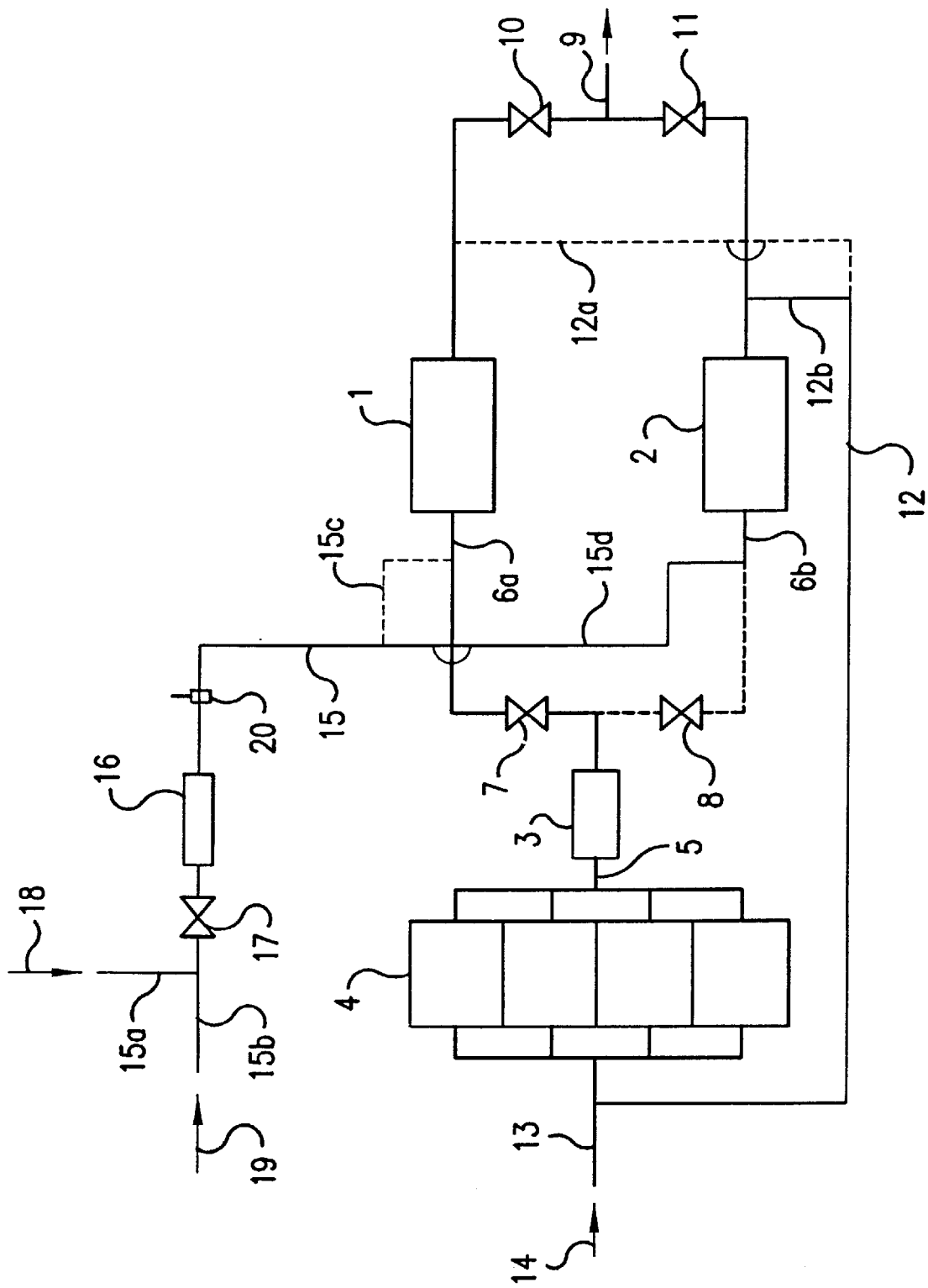

EMISSION CONTROL SYSTEM FOR AN INTERNAL-COMBUSTION ENGINE

BACKGROUND OF THE INVENTION

This application claims the priority of German Application No. 197 47 670.8, filed on Oct. 29, 1997, the disclosure of which is expressly incorporated by reference herein.

The present invention relates to an emission control system for an internal-combustion engine having at least two nitrogen oxide adsorbers arranged in parallel for the alternating periodic adsorption and desorption of nitrogen oxides contained in the exhaust gas of the internal-combustion engine and devices for providing a desorption gas flow for the nitrogen oxide adsorbers running in each case in the desorption operation.

Nitrogen oxide adsorbers in emission control systems are known for adsorbing in the adsorption operation nitrogen oxides contained in the exhaust gas and thus removing them from the exhaust gas which can then be discharged to the outside largely without nitrogen oxides. From time to time, i.e., no later than when it reaches its nitrogen oxide storage capacity, the respective nitrogen oxide adsorber is run in the desorption operation in which the nitrogen oxides adsorbed therein are desorbed again. The exhaust gas flow which takes up the desorbed nitrogen oxides will then be treated appropriately, for example, and will be returned into an intake pipe of the internal-combustion engine in order to react the desorbed nitrogen oxides by the combustion in the internal-combustion engine to nitrogen and oxygen.

An emission control system is described in DE 43 19 294 C1. There, two parallel nitrogen oxide adsorbers are alternatingly run in the adsorption and in the desorption operation. For the desorption, fresh air is fed into the corresponding nitrogen oxide adsorber by way of an air pipe and this nitrogen oxide adsorber or the fed fresh air is heated externally while simultaneously the feeding of the exhaust gas flow remains blocked. In contrast, the feeding of air and the external heating of the respective adsorber do not take place in the adsorption operation in which the exhaust gas flow of the internal-combustion engine flows through the adsorber.

German Patent Application No. 196 28 796.0 describes an emission control system which has two adsorbers, which are arranged in parallel and are alternatingly run in the adsorption and in the desorption operation, and an oxidation catalyst arranged downstream of the adsorbers close to the engine, for the oxidation of NO contained in the exhaust gas to $NO_2$. An exhaust pipe section situated upstream of the adsorbers is divided into a main flow pipe branch and into a partial flow pipe branch which is parallel to the main flow pipe branch and is shorter and/or more thermally insulated than the main flow pipe branch. The adsorber which, in each case, is operated in the adsorption mode is fed by the exhaust gas flow of the main flow pipe branch. and the respective other adsorber operated in the desorption mode is fed by the exhaust gas flow of the partial flow pipe branch. This measure takes into account the fact that a low temperature level promotes the adsorption operation and a higher temperature level promotes the desorption operation and nitrogen oxide adsorbers frequently adsorb $NO_2$ much more easily than NO.

Another emission control system with two nitrogen oxide adsorbers arranged in parallel is disclosed in DE 196 26 837 A1. There, the desorption gas flow providing devices consist, for example, of two electrically heatable catalysts which are connected directly in front of the respective nitrogen oxide adsorber and in front of which, in the respective branch of the exhaust pipe system, a respective fuel injecting unit is connected; or the desorption gas flow providing devices consist of a burner which is assigned jointly to the nitrogen oxide adsorbers and is operated by a slightly lean diesel fuel/air mixture, and of a fuel injecting unit which is connected behind this burner. In the latter, the hot burner exhaust gas acts as a carrier gas for the injected fuel which is fed to the respective nitrogen oxide adsorber by way of a corresponding pipe branch. One or two lambda probes, which are arranged in parallel downstream of the nitrogen oxide adsorbers recognize the end of a respective desorption phase.

SUMMARY OF THE INVENTION

An object of the present invention is to provide an emission control system type which has an advantageous emission control functionality for nitrogen-oxide-containing exhaust gases.

This object has been achieved by an emission control system in which the desorption gas flow providing devices have a desorption gas pipe which the nitrogen oxide adsorbers have in common and which has an externally heatable catalyst, a lambda probe arranged between the externally heatable catalyst and the nitrogen oxide adsorbers, and devices for feeding a mixture of air and/or exhaust gas, on the one hand, as well as fuel at an at least stoichiometric, controllable proportion, on the other hand, to the externally heatable catalyst, in which case the externally heatable catalyst burns the fed mixture to form a desorbing gas flow which is fed to the nitrogen oxide adsorber which is each case is in the desorption operation, by way of a pertaining desorption pipe branch and in which case a predefinable lambda value of the desorbing gas flow is adjusted by way of the lambda probe.

In this system, a desorption gas pipe is provided which the nitrogen oxide adsorbers share and in which an externally heatable catalyst is arranged to which, on one hand, a mixture of air and/or exhaust gas can be fed and to which, on the other hand, fuel can be fed at an at least stoichiometric proportion. and which burns this mixture to form a desorbing gas flow which is fed to the respective nitrogen oxide adsorber situated in the desorption operation. By way of a lambda probe, the lambda value of the desorbing gas flow is adjusted to a desired value, for the purpose of which the lambda probe is inserted downstream of the externally heatable catalyst and upstream of the nitrogen oxide adsorbers into the desorption gas pipe.

As a result, the exhaust gas of a combustion operation of an air/fuel mixture with a controllable, at least stoichiometric fuel fraction (i.e., with a stoichiometric or rich air/fuel ratio) can be fed to the respective nitrogen adsorber to be desorbed, without limiting the operation of the internal-combustion engine. As required, the internal-combustion engine can also be operated with a lean air/fuel mixture during the desorption operation of an adsorber because the adsorber to be desorbed obtains the desorbing gas flow from the burning of the stoichiometric or rich air/fuel mixture in the externally heated catalyst.

It is known that the exhaust gas of such combustion contains unburnt hydrocarbons, carbon monoxide and hydrogen, while the oxygen contained in the air/exhaust gas flow fed to the catalyst burns up almost completely which promotes the desorption operation. The feeding of exhaust gas instead of fresh air for the combustion in the externally heated catalyst has the advantage that the oxygen content in the exhaust gas is already significantly reduced and therefore less fuel must be apportioned in order to obtain the desired, at least stoichiometric fuel fraction.

In addition, the exhaust gas has a higher temperature than fed fresh air. This reduces the energy requirement for the heating of the catalyst and thereby improves the overall energy balance of the system. The nitrogen oxides which are released from the respective adsorber by this desorption operation advantageously uncoupled from the operation of the internal-combustion engine can then be treated appropriately, for example, by the return into an intake pipe system of the internal-combustion engine. The emission control system is particularly suitable also for the emission control of internal-combustion engines of motor vehicles.

In an emission control system of the present invention, the externally heatable catalyst is formed by an electrically heatable catalyst with a comparatively low volume, a so-called electrically heatable minicatalyst (also called min-E-catalyst) as customary, for example, in the case of internal-combustion engines of motor vehicles for different purposes.

BRIEF DESCRIPTION OF THE DRAWING

These and further objects, features and advantages of the present invention will become more apparent from the following detailed description of a currently preferred embodiments when taken in conjunction with the accompanying drawing wherein:

The single FIGURE is a schematic block diagram of essential parts of a motor vehicle internal combustion engine emission control system according to the present invention.

DETAILED DESCRIPTION OF THE DRAWING

For purifying the exhaust gas of a motor vehicle engine 4, the illustrated emission control system has two nitrogen oxide adsorbers 1, 2 and one oxidation catalyst 3. The oxidation catalyst 3 is situated in an exhaust gas section 5 adjoining the exhaust gas side of the engine 4 and collecting the exhaust gas from the different cylinders, being positioned as close to the engine as possible. Downstream of the oxidation catalyst 3, the exhaust pipe system branches into two parallel partial pipe systems 6a, 6b in which one of the two nitrogen oxide adsorbers 1, 2 respectively is arranged.

At the inlet side of the two parallel partial exhaust pipe systems 6a, 6b, one control valve 7, 8 respectively is provided, of which, in an alternating manner, one is open and the other one is closed in order to admit, in a periodically alternating fashion, to one of the two adsorbers 1, 2 respectively the exhaust gas flow emerging from the oxidation catalyst 3. The FIGURE illustrates the valve 7 open which allows the exhaust gas emerging from the oxidation catalyst 3 to flow to the pertaining adsorber 1, and the other valve 8 closed so that the engine exhaust gas will not arrive in the other adsorber 2, which is symbolized by the broken line of the section of this partial exhaust pipe system 6b situated upstream of this adsorber 2.

Downstream of the two parallel nitrogen oxide adsorbers 1, 2, the two partial exhaust pipe systems 6a, 6b combine again to form a joint discharging exhaust pipe system 9, in which case, in front of the combining point in each partial exhaust pipe system 6a, 6b, one control valve 10, 11 respectively is arranged again in order to pass on the exhaust gas flow emerging from the corresponding adsorber 1, 2 optionally into the discharging exhaust pipe system 9 or to prevent it from being passed on.

The exhaust gas flow which is in each case prevented from being passed on into the discharging exhaust pipe system 9, by way of a respective return pipe branch 12a, 12b, which branches off the area of the corresponding partial exhaust pipe system 6a, 6b between the adsorber 1, 2 and the control valve 10, 11, arrives in a joint exhaust gas return pipe 12 to which the two return pipe branches 12a, 12b combine. As illustrated, the control valve 11 is closed so that the exhaust gas emerging from the adsorber 2 is fed by way of the pertaining return pipe branch 12b into the return pipe 12, while the other outlet-side control valve 10 is open and permits the exhaust gas emerging from the other adsorber 1 the passage into the discharging exhaust pipe system 9 so that the concerned return pipe branch 12a carries no noticeable exhaust gas flow, which is symbolized by its broken line course. The exhaust gas fed into the return pipe 12 is fed by way of this return pipe 12 into an intake pipe 13 and is thereby admixed to the air flow 14 taken in by the engine 4.

Characteristically, the illustrated system also contains a desorption gas pipe 15 in which an electrically heatable catalyst 16 is arranged which has a comparatively small catalyst volume, that is, a so-called mini-E-catalyst. Upstream of the mini-E-catalyst 16, a control valve 17 is situated for feeding a combustible mixture in a controlled manner to the mini-E-catalyst 16, for the purpose of which, on the one hand, fuel 18 and, on the other hand, fresh air 19 or, as an alternative, engine exhaust gas or a fresh air/engine exhaust gas mixture can be fed by way of two mutually combining inlet pipe branches 15a, 15b into the desorption gas pipe 15.

By way of a lambda probe 20 inserted downstream of the mini-E-catalyst 16 into the desorption gas pipe 15, the air/fuel ratio or the exhaust gas ratio can be regulated. Downstream of the lambda probe 20, the desorption gas pipe 15 branches out into two desorption pipe branches 15c, 15d, of which one respectively leads into one of the two parallel partial exhaust pipe systems 6a, 6b between its inlet-side control valve 7, 8 and the concerned adsorber 1, 2.

In the mini-E-catalyst 16, by a combustion of the fed mixture, a desorbing gas flow is generated which, by way of the corresponding desorption pipe branch 15c, 15d is, in each case, fed to the adsorber which is just in the desorption operation and is therefore not acted upon by the engine exhaust gas flow. In contrast, by way of the pertaining opened inlet-side control valve 7, the engine exhaust gas flow is fed to the other adsorber which, in the illustrated condition, is adsorber 1, which, on the other hand, has the result that no noticeable portion of the desorbing gas flow arrives in this adsorber by way of the concerned desorption pipe branch. This is symbolized in that the desorption pipe branch 15c which momentarily is carrying no significant desorbing gas flow is illustrated by a broken line.

The above-described emission control system operates as follows. The exhaust gas emitted by the engine 4 arrives in the discharging, collecting exhaust pipe section 5 and in the process in the oxidation catalyst 3 positioned close to the engine. This oxidation catalyst 3 oxidizes the nitrogen monoxide, the carbon monoxide and the hydrocarbons which are contained in the exhaust gas. The positioning of the oxidation catalyst 3 close to the engine allows an effective oxidation reaction to start very early after a respective start of the engine 4. The oxidation of CO and unburnt hydrocarbons causes an improved nitrogen oxide adsorption in that the concurring adsorption caused by these constituents does not occur to a noticeable degree.

The oxidation of NO to $NO_2$ has the advantage that the latter can be adsorbed more easily than NO by most adsorber materials conventionally used in nitrogen oxide adsorbers, so that this measure promotes the removal of nitrogen oxides from the exhaust gas. From the oxidation catalyst 3, the engine exhaust gas pretreated in this manner is then fed in an alternating fashion by the corresponding triggering of the valves 7, 8 to one of the two adsorbers 1, 2. As the result, this adsorber is defined as the one which is momentarily running in the adsorption operation. The engine exhaust gas purified thereby with respect to nitrogen oxides leaves the corresponding adsorber and, by way of the pertaining outlet-side opened control valve 10 or 11, arrives in the discharging exhaust pipe system 9 and from there on the outside or, as required, in an adjoining, additional exhaust gas purification step.

In the meantime, the other nitrogen oxide adsorber, which is at the particular moment not acted upon by engine exhaust gas, as required, is subjected to a desorption operation. For this purpose, the generated desorbing gas flow is fed thereto by way of the desorption gas pipe 15, whereas it remains blocked with respect to a feeding of engine exhaust gas by a corresponding triggering of its control valve connected in front.

Because of the desorbing characteristics of the gas flow, particularly because of its combustion heat and the constituents contained therein, such as unburnt hydrocarbons, the nitrogen oxides adsorbed in the respective adsorber can be released rapidly and reliably. The exhaust gas flow which emerges from the adsorber run in the desorption operation and which contains the released nitrogen oxides is passed along by way of the respective return pipe branch into the return pipe 12 for the purpose of which the pertaining outlet-side control valve is held closed in front of the discharging exhaust pipe system 9. By way of the return pipe 12, this exhaust gas flow and thus the nitrogen oxides contained therein arrive in the intake pipe 13, from which the nitrogen oxides are supplied to the combustion process in the engine 4 and are burnt there to yield nitrogen and oxygen.

For generating the desorbing gas flow, the mini-E-catalyst 16 is sufficiently heated at the beginning of a respective nitrogen oxide desorption phase. By way of the inlet-side valve 17, it is then fed a small air or exhaust gas flow schematically shown by the arrow 19 together with a suitable amount of fuel 18 which is already available on board for the internal-combustion engine 4, for the purpose of the combustion of the thus obtained mixture. In this case, the fuel 18 is fed in a stoichiometric or overstoichiometric proportion; i.e., with a lambda value of no more than equal to one. For providing the small air or exhaust gas flow schematically shown by the arrow 19 during the operation of the mini-E-catalyst 16, for example, the use of a secondary air pump is suitable.

When an exhaust gas flow is used instead of a fresh air flow, it is an advantage that the oxygen content in the exhaust gas is already significantly reduced and therefore less fuel must be apportioned in order to reach the desired, at least stoichiometric fuel proportion. In addition, the exhaust gas has a higher temperature than supplied air so that less energy is required for heating the mini-E-catalyst 16, which improves the overall energy balance of the system. In the heated mini-E-catalyst 16, the burning of this stoichiometric or rich mixture takes place while forming $CO$, $H_2$ and unburnt hydrocarbons. The oxygen contained in the fed air or the fed exhaust gas is almost completely burnt in the process. The lambda probe 20 adjusts the desired air/fuel ratio or exhaust gas ratio.

The thus generated desorbing gas flow causes, for the respective nitrogen oxide adsorber to be desorbed, in each case, a change of the exhaust gas atmosphere to a lambda value of no more than equal to 1, as is favorable for the nitrogen oxide desorption, with respect to the engine exhaust gas atmosphere which, for reasons of fuel consumption, is preferably at lambda values higher than 1. Because the desorbing gas flow is provided by the mini-E-catalyst 16, and the internal-combustion engine 4 is therefore not required for this purpose, the internal-combustion engine operation can be uncoupled from the desorption phases of the nitrogen oxide adsorbers 1, 2. That is, the internal-combustion engine can be operated by a respective desired lambda value without resulting limitations because of required desorption operations for the nitrogen oxide adsorbers 1, 2. In particular, as required, the internal-combustion engine 4 can continuously be run in the lean operation.

In is understood that, in addition to the illustrated system, additional systems can be implemented according to the invention by the person skilled in the art which have a modified construction. Thus, optionally, instead of the electrically heatable mini-catalyst, a mini catalyst may be provided in the desorption pipe which can be externally heated in a different manner. In addition, instead of the two illustrated adsorbers, more than two parallel adsorbers can be provided, in which case each adsorber can be acted upon in a controllable manner by the desorbing gas flow provided in the desorption gas pipe, for the purpose of a desorption. Optionally, the oxidation catalyst may be eliminated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Emission control system for an internal-combustion engine, having at least two nitrogen oxide adsorbers arranged in parallel for alternating periodic adsorption and desorption of nitrogen oxides contained in exhaust gas of the internal-combustion engine and devices for providing a desorption gas flow for each of the nitrogen oxide adsorbers running in desorption mode, wherein the desorption gas flow providing devices have a desorption gas pipe which the nitrogen oxide adsorbers share and which has an externally heatable catalyst, a lambda probe operatively arranged between the externally heatable catalyst and the nitrogen oxide adsorbers, and devices for feeding a mixture of air and/or exhaust gas as well as fuel at an at least stoichiometric, controllable proportion, to the externally heatable catalyst, such that the externally heatable catalyst burns the fed mixture to form a desorbing gas flow which is fed to the nitrogen oxide adsorber in the desorption mode, by way of an associated desorption pipe branch with a predefinable lambda value of the desorbing gas flow being adjusted by the lambda probe.

2. The emission control system according to claim 1, wherein the externally heatable catalyst is an electrically heatable minicatalyst.

3. Emission control method for an internal combustion engine, comprising the steps of alternating periodic adsorption and desorption modes of nitrogen oxides contained in exhaust gas of the engine through parallel paths;

burning a fed mixture of at least one of air and exhaust gas and fuel at an at least stoichiometric, controllable proportion to form a desorbing gas flow for the desorption mode in one of the paths while an adsorption mode is occurring for nitrogen oxides contained in the exhaust gas in another of the paths; and adjusting a predefinable lambda value of the desorbing gas flow in the one path.

* * * * *